(12) United States Patent
Yowell et al.

(10) Patent No.: US 7,127,953 B1
(45) Date of Patent: Oct. 31, 2006

(54) TARGET FLOW METERS

(76) Inventors: Gordon Yowell, 6173 NW. 23rd Rd., Boca Raton, FL (US) 33434; Duane H. Samuelson, 413 NW. 53rd St., Boca Raton, FL (US) 33487; David H. Gorman, 6222 NW. 170 Ter., Miami, FL (US) 33015; Thomas B. Richartz, 130 Monica Ave., Royal Palm Beach, FL (US) 33411; James A. Gayoso, 6012 Rose Ter., Plantation, FL (US) 33317; Stephen I. Kaylor, 823 NW. 42 Pl., Pompano Beach, FL (US) 33064; Jun Chen, 11212 Sea Grass Cir., Boca Raton, FL (US) 33498

( * ) Notice: Subject to any disclaimer, the term of this patent is extended or adjusted under 35 U.S.C. 154(b) by 21 days.

(21) Appl. No.: 11/110,238

(22) Filed: Apr. 20, 2005

(51) Int. Cl.
*G01F 1/28* (2006.01)
(52) U.S. Cl. .................................. 73/861.74
(58) Field of Classification Search ............. 73/861.71, 73/861.74, 861.73
See application file for complete search history.

(56) References Cited

U.S. PATENT DOCUMENTS 4,788,869 A * 12/1988 Li ........................... 73/861.71
6,253,625 B1 * 7/2001 Samuelson et al. ...... 73/861.71

* cited by examiner

*Primary Examiner*—Jewel Thompson

(57) ABSTRACT

A target flow meter has a target with a broad face attached to the free end of a rigid stalk. A fixed end of the stalk is attached to a rigid support secured in the system to be measured with the broad face of the target disposed transverse to the fluid flow. The support and the stalk may be made in one piece. Recesses in the support at the junction with the stalk, one upstream, and one downstream of the flow may reduce the thickness of the support so that bending of the support in response to flow forces is concentrated at the recesses. Strain gauges are attached to the support at the recess areas to measure target movement. The support is sealed to the fluid chamber with the gauges outside the fluid chamber. The recesses in the support may be on the fluid side or the outside of the support.

13 Claims, 4 Drawing Sheets

TARGET FLOW METERS

BACKGROUND OF THE INVENTION

This invention relates to devices in fluid paths that indicate flow rate, and more particularly to target type flow meters having a target in the flow path attached to a stalk. The stalk is attached to a base. The base has attached strain gauges outside the fluid for enhanced manufacture and stability.

DESCRIPTION OF THE PRIOR ART

Target flow meters have distinct advantages over other types of flow meters. They operate on the principle that the amount of force generated by onrushing fluid passing a disc target whose surface is oriented perpendicular to the direction of flow is proportional to the square of the flow velocity. The drag beyond the target produces a lower pressure area than ahead of the target, producing a net force that bends the stalk. Strain gauges measure the deflection. This makes for easy calibration. The stalks are generally affixed to substantial bending beams outside the fluid chamber, with the strain gauges attached to the beam.

U.S. Pat. No. 6,253,625 issued Jul. 3, 2001 to Samuelson et al. discloses a target flow meter in which the strain gauges are directly attached to the stalk for enhanced sensitivity. The strain gauges are thus immersed in the liquid being measured. It is necessary to protect the strain gauges from effects of the liquid as well as providing seals for the wires leading from the gauges to the outside. Problems with sealants and leakage of seals may make this type of flow meter unsuitable for certain applications. It would be useful to have flow meters with enhanced sensitivity that have the advantage that the electrical elements and wires are all outside the fluid, eliminating sealing and leakage problems.

SUMMARY OF THE INVENTION

It is accordingly an object of the invention to provide a target flow meter that is more sensitive than conventional flow meters. It is another object that the flow meter be simpler and more compact in structure. The target flow meters of the invention have a target positioned in the flow path by an attached rigid stalk. The stalk is affixed to a support element, or base. The base is sealed to the fluid chamber with the stalk inside the chamber. Recesses in the base at the junction with the stalk provide reduced thickness areas that enable the stalk to move, with the movement transmitted to those areas. The strain gauges are applied directly to the base at the reduced thickness areas on the outside of the base and outside the fluid chamber to sense the movement of the stalk in response to the force of flow. The strain gauges and their wires are not exposed to the fluid. Direct simple mathematical relationship is maintained between the flow rate and strain gauge output in the turbulent flow range. A temperature sensing element may be included with the strain gauges for enhanced measurement accuracy, but this is not as great a problem as with gauges exposed to the hot fluid. These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figures 1, 3:
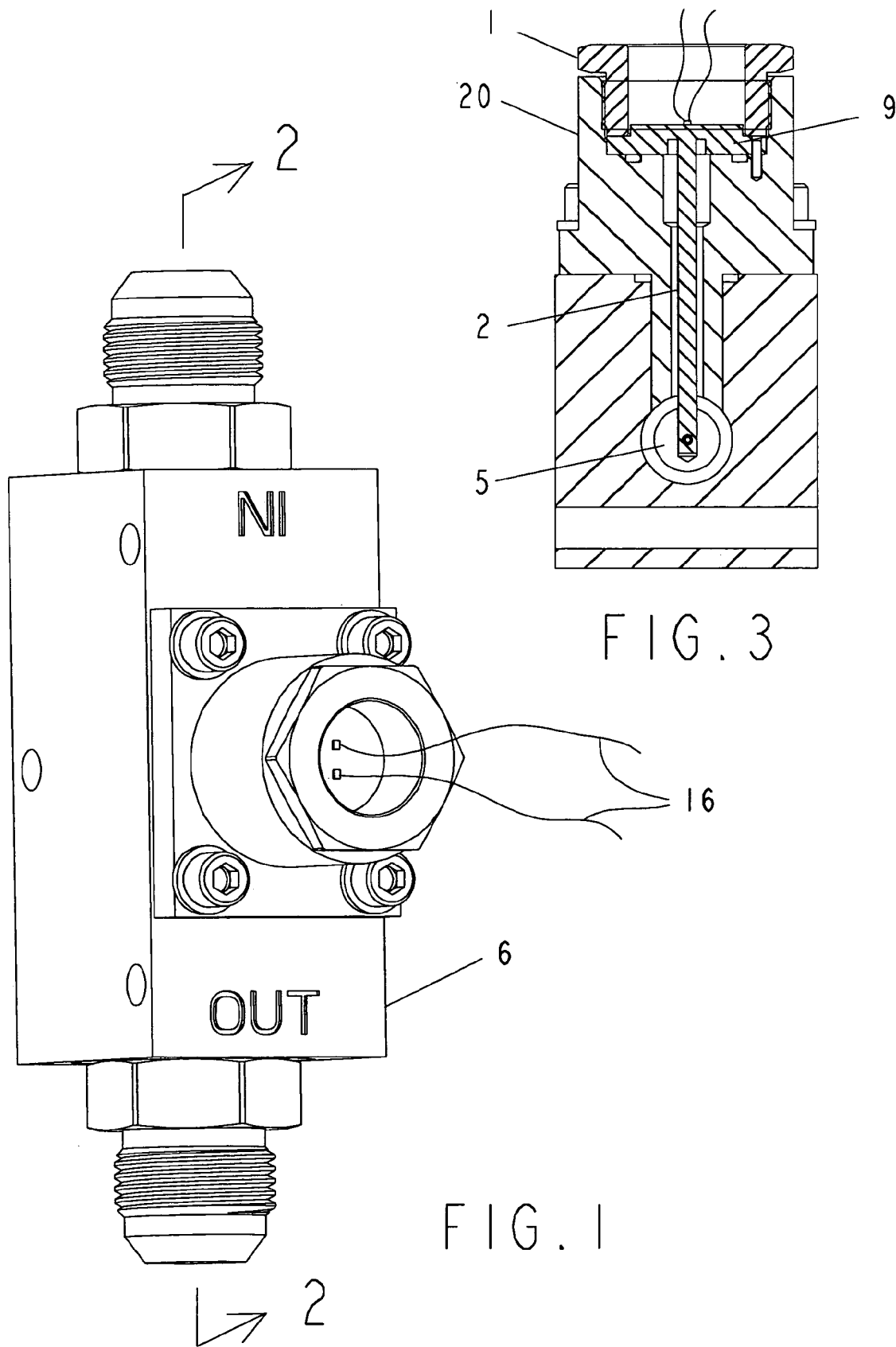
FIG. 1 is a perspective view of the flow meter of the invention in a housing.
FIG. 3 is a sectional view through line 3—3 of FIG. 2.
Figure 2:
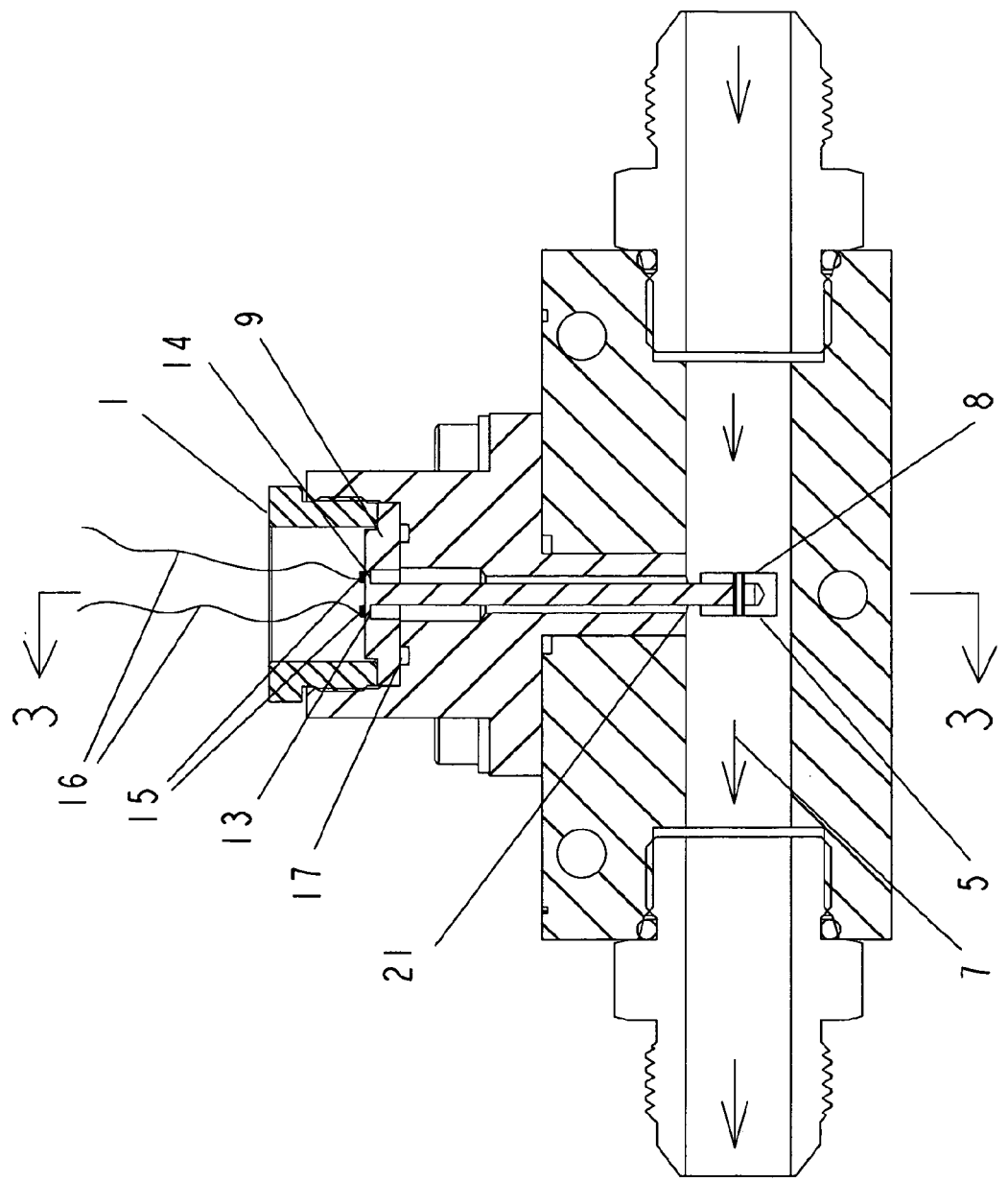
FIG. 2 is a sectional view through line 2—2 of FIG. 1.
Figure 6:
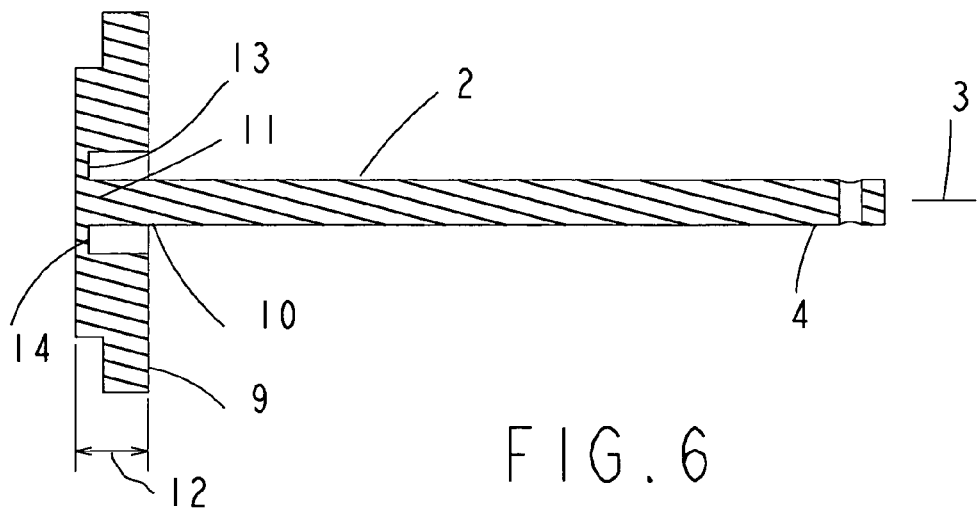
FIG. 6 is a sectional view through line 6—6 of FIG. 5.
Figure 4:
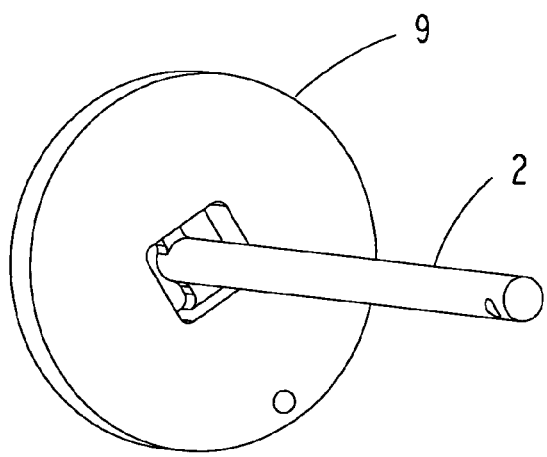
FIG. 4 is a perspective view of a stalk and support element of FIG. 1.
Figure 5:
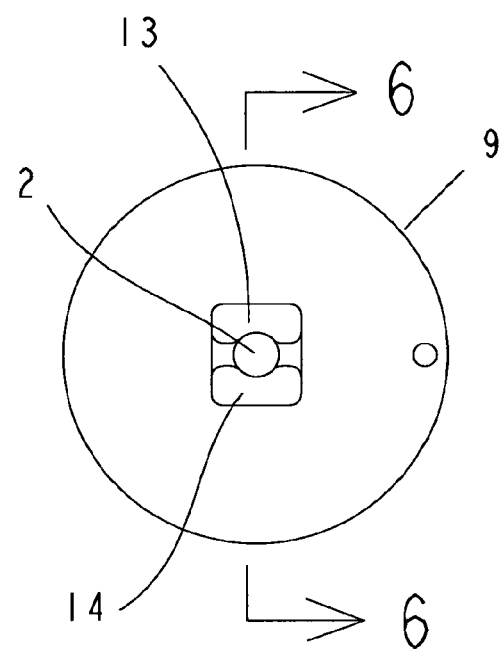
FIG. 5 is a bottom view of a stalk and support element of FIG. 1.

Referring now to the drawing FIGS. 1–6, a target flow meter 1 of the invention is mounted in a housing 6 with a fluid flow path 7 to facilitate insertion into an assembly. The target member 5 is mounted with its broad face 8 transverse to the fluid flow. The target member 5 is mounted on an elongate rigid stalk 2 at its first end 4. The stalk has a long axis 3. The stalk is fixed to a rigid support element 9 at its second end 10 to hold the target member 5 in the fluid chamber in a fixed orientation to the fluid flow. The stalk and support element may be formed in one piece (monolithic), or they may be formed separately and subsequently joined together at junction 11. Sealing ring 17 seals the support element 9 to the fluid chamber. Stop means 21 limits deflection of the stalk from excessive flow force. The support element 9 has a particular thickness 12. A recess 13 in element 9 adjacent junction 11 downstream of the stalk, and recess 14 in element 9 adjacent junction 11 upstream from the stalk provide reduced thickness areas of element 9 to thereby concentrate bending forces on the target. Strain gauges 15 are applied to the surface of element 9 at these reduced thickness areas outside the fluid chamber. Wires 16 connect the strain gauges to measuring instruments (not shown) to indicate fluid flow rate.

Figure 8:
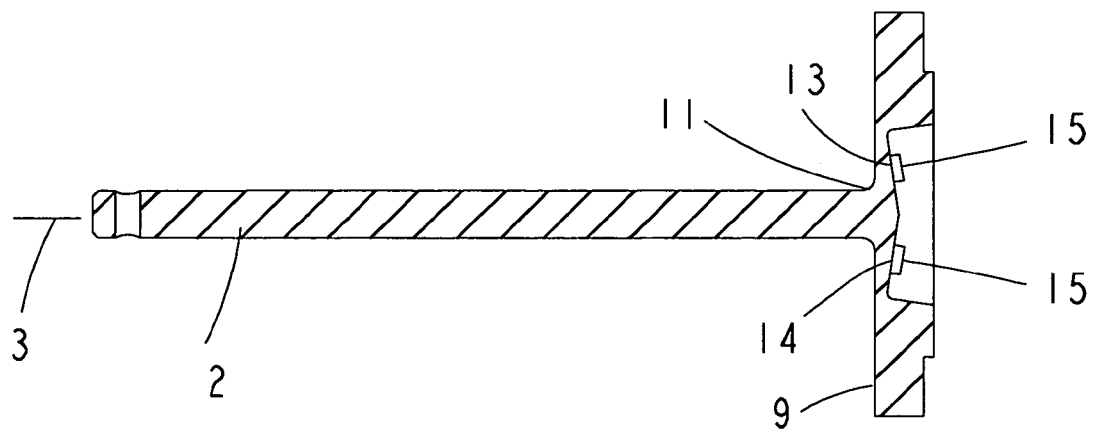
FIG. 8 is a sectional view through line 8—8 of FIG. 7.
Figure 7:
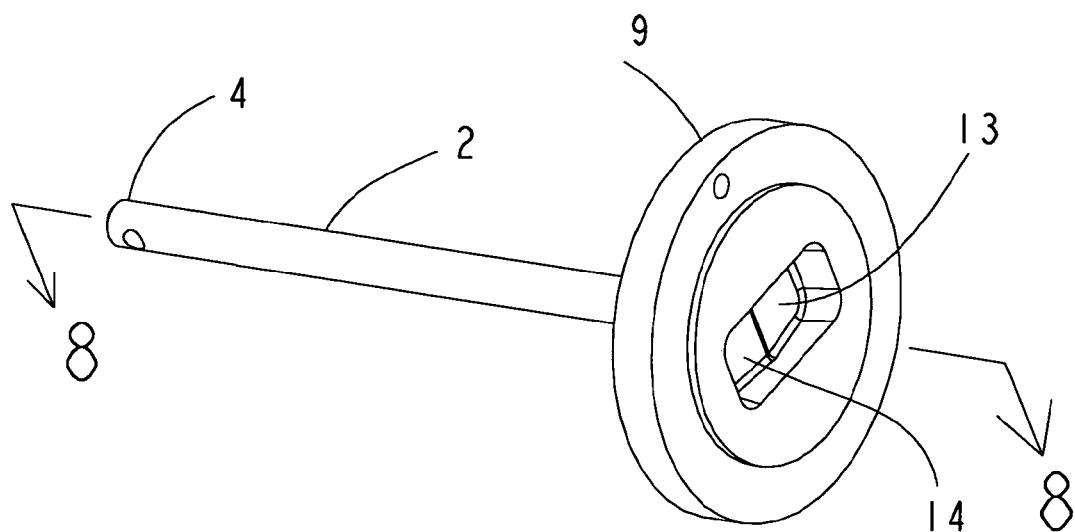
FIG. 7 is a perspective view of another embodiment of the stalk and support element of the invention.

Referring now to FIGS. 7 and 8, another embodiment of the invention shows a support element 9' with a stalk 2' having a long axis 3'. A target member (not shown) is affixable to a first end 4'. Recesses 13' and 14' formed in the surface of element 9' adjacent the junction 11' provide the reduced thickness areas to concentrate bending action. Strain gauges 15 are attached to the reduced thickness areas to provide signals related to the forces on the target. The recesses 13' and 14' have planar surfaces 22 that are non-orthogonal to the long axis 3'. This may reduce the variability of response of the gauges as they are positioned at slightly different areas.

The above disclosed invention has a number of particular features which should preferably be employed in combination, although each is useful separately without departure from the scope of the invention. While we have shown and described the preferred embodiments of our invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A flow meter for use within a fluid chamber for measuring fluid flow in a flow path, the flow meter comprising:
   a) an elongate rigid stalk having a long axis, a first end, and a second end;
   b) a target member attached to the first end of the stalk, and arranged to be positioned in the path of the fluid flow to be measured with a broad face of the target member transverse to the flow;
   c) a support element, having a particular thickness, connected at a junction to the second end of the stalk for holding the target member in position;
   d) recesses in the support element adjacent the junction to provide reduced thickness areas of the support element to thereby concentrate bending of the support element in response to fluid forces on the target;
   e) sealing means for sealing the support element to the fluid chamber;
   f) a pair of strain gauges affixed to the support element outside the fluid chamber at the reduced thickness areas, one upstream of the stalk, and one downstream of the stalk; and
   g) a plurality of wires connected at one end to the strain gauges and adapted for connection to measuring apparatus at the other end.

2. The flow meter of claim 1, further comprising a housing having stop means for limiting deflection of the stalk.

3. The flow meter of claim 2, in which the recesses are in the support element outside the fluid chamber, and in which the recesses have a planar surface disposed at a non-orthogonal angle to said long axis.

4. The flow meter of claim 2, in which the recesses are in the support element inside the fluid chamber, and in which the recesses have a planar surface disposed at a non-orthogonal angle to said long axis.

5. The flow meter of claim 1, in which the recesses are in the support element outside the fluid chamber, and in which the recesses have a planar surface disposed at a non-orthogonal angle to said long axis.

6. The flow meter of claim 1, in which the recesses are in the support element inside the fluid chamber, and in which the recesses have a planar surface disposed at a non-orthogonal angle to said long axis.

7. A flow meter for use within a fluid chamber for measuring fluid flow in a flow path, the flow meter comprising:
   a) an elongate rigid stalk having a long axis, a first end, and a second end;
   b) a target member attached to the first end of the stalk, and arranged to be positioned in the path of the fluid flow to be measured with a broad face of the target member transverse to the flow;
   c) a support element, having a particular thickness, connected at a junction to the second end of the stalk for holding the target member in position, the support element being monolithic with the stalk;
   d) recesses in the support element adjacent the junction to provide reduced thickness areas of the support element to thereby concentrate bending of the support element in response to fluid forces on the target;
   e) sealing means for sealing the support element to the fluid system;
   f) a pair of strain gauges affixed to the support element outside the fluid chamber at the reduced thickness areas, one upstream of the stalk, and one downstream of the stalk; and
   g) a plurality of wires connected at one end to the strain gauges and adapted for connection to measuring apparatus at the other end.

8. The flow meter of claim 7, further comprising a housing, the housing having stop means for limiting deflection of the stalk.

9. The flow meter of claim 8, in which the recesses are in the support element outside the fluid chamber, and in which the recesses have a planar surface disposed at a non-orthogonal angle to said long axis.

10. The flow meter of claim 8, in which the recesses are in the support element inside the fluid chamber, and in which the recesses have a planar surface disposed at a non-orthogonal angle to said long axis.

11. The flow meter of claim 7, in which the recesses are in the support element outside the fluid chamber, and in which the recesses have a planar surface disposed at a non-orthogonal angle to said long axis.

12. The flow meter of claim 7, in which the recesses are in the support element inside the fluid chamber, and in which the recesses have a planar surface disposed at a non-orthogonal angle to said long axis.

13. A flow meter for use within a fluid system for measuring fluid flow in a flow path, the flow meter comprising:
   a) an elongate rigid stalk having a long axis, a first end, and a second end;
   b) a target member attached to the first end of the stalk, and arranged to be positioned in the path of the fluid flow to be measured with a broad face of the target member transverse to the flow;
   c) a support element, having a particular thickness, connected at a junction to the second end of the stalk for holding the target member in position;
   d) sealing means for sealing the support element to the fluid system;
   e) a pair of strain gauges affixed to a surface of the support element outside the fluid chamber, one upstream of the stalk, and one downstream of the stalk; and
   f) a plurality of wires connected at one end to the strain gauges and adapted for connection to measuring apparatus at the other end.

* * * * *